United States Patent Office 2,898,380
Patented Aug. 4, 1959

2,898,380

PRODUCTION OF ALPHA-TERPINEOL

Richard Herrlinger, Panama City, Fla., and Murray Garber, Norwalk, Conn., assignors to American Cyanamid Company, New York, N.Y., a corporation of Maine No Drawing. Application March 27, 1958
Serial No. 724,275

6 Claims. (Cl. 260—631.5)

This invention relates to methods of preparation of synthetic pine oil, or alpha-terpineol, from pinene-containing materials and, more particularly, relates to methods of preparing synthetic pine oil from alpha-pinene and/or beta-pinene without the necessity of isolating or purifying the intermediate terpin hydrate produced in such methods of preparation.

Hitherto, synthetic pine oil has been produced from pinene-containing materials by several methods, the most common of which has comprised a two-stage process. The first stage of a typical prior art process has consisted of treating a pinene-containing material with an acid, such as sulfuric acid, of a concentration and at a temperature and for a sufficient period of time to form a crude reaction mixture comprising a slurry of terpin hydrate, sulfuric acid, unreacted pinene-containing material and other oil by-products.

This first stage of this process has then been followed by the separation of the sulfuric acid and the purification of the terpin hydrate from the reaction impurities found therewith by various means, particularly by neutralization and steam distillation or by centrifuging and repeated washings with water, or the like.

This purification step has been necessarily employed previously in order that a relatively pure terpin hydrate be available for the subsequent second stage partial dehydration of the terpin hydrate to alpha-terpineol.

This second stage dehydration customarily involved a reaction with a low concentration of mineral acids or organic acids such as sulfuric acid, phosphoric acid or oxalic acid, or with certain salts, such as sodium acid sulfate, or the like, involving essentially the removal of one mole of combined water and one of the hydroxyl radicals and a hydrogen atom from the terpin hydrate molecule to form an alpha-terpineol molecule containing an ethylenic linkage.

If the intermediate purification step were to be omitted or not carried out properly and the crude terpin hydrate containing variable and uncertain amounts of sulfuric acid remaining from the first stage reaction were to be treated directly with additional acid for dehydrating purposes, the result would normally be a more severe dehydration of a considerable part of the crude terpin hydrate to a completely dehydrated end-product, such as dipentene, and consequent decreased yields of alpha-terpineol. Clearly then, this critical control over the acidity of the dehydration reaction created difficult operational problems, thus requiring the exercise of a high degree of skill and care in order that the acidity be closely established to avoid over-dehydration.

Efforts to remove the sulfuric acid from the crude terpin hydrate, prior to dehydration, by simple washing methods with aqueous media have hitherto been substantially unsuccessful because of the formation of agglomerates which hinder such washing methods and, consequently, complicated separation and purification systems involving neutralization and steam distillation, or centrifuging and repeated washings, or the like, have been used. Such systems, however, are complicated, time consuming and expensive and, in the case of centrifuging, involve removal of the reaction product from the reaction kettle and leave much to be desired.

It is, therefore, a principal object of the present invention to provide a method of preparing alpha-terpineol from pinene-containing materials without isolating the intermediate terpin hydrate and without removing the reaction product from the reaction kettle, whereby the need of expensive equipment, such as steam distillation apparatus, or centrifuges, is avoided and whereby the necessity of a purified and isolated intermediate terpin hydrate is obviated.

This has been accomplished by initially reacting a pinene-containing material with sulfuric acid under suitable conditions whereby there is obtained a lower sulfuric acid layer and an upper layer containing the crude intermediate product comprising terpin hydrate, unreacted pinene-containing materials, oily by-products and occluded sulfuric acid in the form of typical large agglomerates. The sulfuric acid layer is then removed and the layer containing the crude agglomerated product is treated in the reaction kettle by dilution with selected terpene material, aliphatic or aromatic hydrocarbons or other suitable solvents whereby the large agglomerates are broken up and dispersed or dissolved to permit a simple but effective washing with aqueous media to reduce the sulfuric acid content contained in the crude reaction product to predetermined levels without removing the reaction mixture from the kettle. The crude reaction product of established acidity is then treated with a predetermined amount of additional acid to bring the acidity to a desired range wherein it is controllably dehydrated to synthetic pine oil, or alpha-terpineol.

As examples of the pinene-containing materials to be employed as raw materials in the initial hydration reaction with sulfuric acid the following may be cited as illustrative; alpha-pinene, beta-pinene, gum turpentine, wood turpentine, sulfate wood turpentine, and the like. It is thus apparent that any material containing a sufficient concentration of alpha-pinene and/or beta-pinene is acceptable for the application of the principles of the present invention.

In the following description, alpha-pinene will be used primarily for the purpose of setting forth the preferred pinene-containing material for the application of the present invention. It is to be pointed out, however, that such is merely illustrative of the invention and is not to be construed as limitative of the starting materials employed.

In the initial reaction between alpha-pinene (or other pinene-containing material) and sulfuric acid, it has been found that the specific mole-ratio of these reactants may be varied within relatively wide ranges. For example, for each mole of alpha-pinene, there has been successfully used as low as less than 1 mole of sulfuric acid or as high as more than 4 moles of sulfuric acid. However, it has been found that a molar ratio of sulfuric acid to alpha-pinene of about 2:1 is preferred, inasmuch as such a ratio has been found most expedient to handle, as well as being capable of giving greater yields.

The concentration of sulfuric acid should be within the range from about 20% to about 40% and the reaction should preferably take place within a temperature range of from about 20° C. to about 40° C. for a period of at least 6 hours and up to 24 hours or more, if desired. The preferred conditions have been found to be 30% sulfuric acid in a temperature range of about 25°–35° C. for at least 8 hours, and preferably 12 hours.

A surface active agent or emulsifier is present during this hydration reaction and such an agent should be capable of forming a good stable emulsion which will not break during moderate agitation of the reaction mixture but which will permit the two layers to separate completely within a reasonably short time after the cessation of agitation following the completion of the reaction. It is, of course, apparent that such a surface active agent must be stable under strong acidic conditions. Various emulsifying agents have been used and found satisfactory for this reaction and the following are cited as exemplary: non-ionic agents such as the condensation product of alkylphenols and ethylene oxide (notably Igepal CO–630), as well as anionic agents such as the Igepon T products (such as sodium N-methyl-N-oleyl taurate).

The resulting crude agglomerated mixture of terpin hydrate, terpene hydrocarbons, occluded sulfuric acid and oily by-products resulting from the sulfuric acid treatment is allowed to separate from the heavier sulfuric acid layer which is drawn off and normally reserved for reuse. The separated crude and unpurified terpin hydrate mixture containing occluded sulfuric acid is then diluted, still in the original reaction kettle, with from about 5% to about 15% by weight (based on the weight of the original charge of pinene-containing material) of a selected hydrocarbon material whereby the large agglomerates containing terpin hydrate are broken up into a more finely divided material which can be easily and thoroughly washed with water and the occluded acid can be effectively reduced to desired amounts.

The hydrocarbon material can be any liquid which is a solvent for the unreacted pinene-containing materials and which is capable of reducing the viscosity of the mixture containing the terpene reaction products. Additionally, it should have a boiling range sufficiently different from the boiling range of the constituents of pine oil to allow the complete separation and recovery of the pine oil by fractional distillation. In the event that it is desired to recover the unreacted pinene-containing material also, the hydrocarbon diluting material should preferably have a boiling range sufficiently different therefrom to permit their separation by fractional distillation.

As examples of these hydrocarbon materials, the following may be cited: the liquid monocyclic and bicyclic terpenes, such as alpha-pinene, beta-pinene, turpentine, dipentene, terpinene, terpinolene, menthane, and the like; petroleum or other liquid hydrocarbons such as the straight- or branched-chain alkanes such as: heptane; hexane; pentane; octane; nonane; 4-ethyl heptane; 2,6-dimethyl heptane; 3-methyl octane; 3,4-dimethyl hexane; and the like; aromatic compounds such as benzene; toluene; cymene; cumene; etc. It is to be noted, however, that the preferred solvent is the pinen-containing material originally used in the hydration reaction with sulfuric acid, inasmuch as separation and recovery of the unreacted pinene-containing materials as well as the diluent is then possible in one step.

The terpin hydrate mixture is then capable of being washed with aqueous media to remove the occluded sulfuric acid whereby the acidic content of the terpin hydrate is readily reduced to any desired concentration depending on the number of washings but necessarily to a concentration less than 1.0% by weight of acidic materials, based on the weight of the slurry, and preferably down to 0.5% by weight of acidic materials. The washing is carried out by adding water or other aqueous wash liquid to the terpin hydrate mixture in the reaction kettle in which it was formed, agitating the mixture and drawing off a lower aqueous layer containing residual acid.

The terpin hydrate-oil slurry of known acidity is then refluxed with an aqueous solution adjusted by the addition, if necessary, of sulfuric acid to bring the concentration to a range of from about 0.05% to about 1% of sulfuric acid (.01 N–0.2 N), until the terpin hydrate is dehydrated to synthetic pine oil or alpha-terpineol. This dehydration normally takes place in approximately 1½ hours with the preferred concentration of 0.5% sulfuric acid.

The invention will be further illustrated in greater detail by the following specific examples. It should be understood, however, that although these examples may describe in particular detail some of the more specific features of the invention, they are given primarily for purposes of illustration and the invention in its broader aspects is not to be construed as limited thereto.

EXAMPLE 1

This example shows that the residual acid present in the agglomerates formed during the first stage reaction of pinene-containing materials cannot be removed by ordinary washing procedures but can be washed out after breaking up these agglomerates by adding a small amount of a hydrocarbon solvent.

Two 5-liter reaction flasks were charged with 791 grams (5.8 moles or 920 ml.) of alpha-pinene and 3729 grams (11.4 moles or 3000 ml.) of 30% aqueous sulfuric acid. A small amount (2 grams) of "Igepal CO–630," an acid-stable surface active agent, was also added to each flask. The mixtures were then agitated for 12 hours while maintaining the temperature at 27°–31° C.

After the reactions were completed the contents of one flask (sample A) were washed with water by the following procedure. The aqueous sulfuric acid layer was first drained off and sufficient water was added to make up the lost volume of recovered acid. After agitating and draining, 680 ml. of water were added and the mixture was agitated for 5 minutes and allowed to settle for 5 minutes and the water was drained off. This procedure was repeated with two additional 900 ml. portions of wash water.

The acidity of the water from the last washing was determined by titration of a sample, and it was found to contain 0.01% of sulfuric acid. This indicated that the wash water was substantially acid-free.

The reaction product in the second flask (sample B) was washed three times by exactly the same procedure and the wash water from the third wash was titrated and found to have the same content (0.01%) of sulfuric acid. The reaction product was then treated by adding 120 grams of alpha-pinene (15% based on the original charge) and agitating to break up agglomerates. The batch was again washed with water by the above-described procedure. The first wash was with 680 ml. of water and after separation from the batch it was found to contain 0.75% of sulfuric acid. The second and third washes were with 900 ml. of water and the sulfuric acid content of the water drained from the third wash was 0.08%.

The second stage of the process was carried out by adding 500 parts of 0.3% sulfuric acid for each 100 parts of terpin hydrate in the two samples and heating at reflux for 3 hours. The products were separated by vacuum distillation under a pressure of 50 mm. of mercury. Three cuts were taken; the first was alpha-pinene (76.5°–84.5° C.); the second was up to 110° C. and consisted principally of monocyclic terpenes, and the third (from 110° to 137° C.) was the pine oil fraction. Both secondary alcohols (borneol and fenchol) and alpha-terpineol distilled over in this fraction. The distillation yields, based on the still charge, were the following:

|  | Sample A | Sample B |
| --- | --- | --- |
| Recovered pinene, Vol. Percent | 2 | 21 |
| Monocyclic terpenes, Vol. Percent | 71 | 27 |
| Secondary alcohols, Vol. Percent | 25 | 3 |
| Terpineol, Vol. Percent | 0 | 46 |

These results show that the residual acid present in the agglomerates of sample A caused the dehydration to progress too far so that the reaction products were monocyclic terpenes and secondary alcohols. The presence of this acid in the agglomerates is shown by the acidity of the wash water after adding alpha-pinene to sample B and its removal resulted in a dehydration product having a reduced content of monocyclic terpenes and secondary alcohols and a good yield of terpineol.

EXAMPLE 2

*Preparation of pine oil from alpha-pinene*

791 grams of alpha-pinene and 3729 grams of 29.8% sulfuric acid were agitated in the presence of 0.79 gram of Igepal CO-630 (a condensation product of an alkyl phenol and ethylene oxide) for 12 hours at a temperature of 25°–30° C. After draining off the spent acid, 79 grams of alpha-pinene were added and the slurry was washed with water to an apparent acidity of about 0.01%. To the terpin hydrate-oil slurry were added 1100 ml. of 0.5% sulfuric acid and the mixture refluxed for approximately 1.5 hours. The resulting crude pine oil (88%) was neutralized with 2% sodium carbonate and then fractionated, adding 0.1% NaOH to the still pot. The yield of distilled pine oil (B.P. 114°–136.5° C./50 mm.) was 63.2%, based on the amount of pinene used.

EXAMPLE 3

*Preparation of pine oil from beta-pinene*

396 grams of beta-pinene and 1864 grams of 29.4% sulfuric acid were agitated in the presence of 0.39 gram of Igepal CO-630 for 12 hours at a temperature of 25°–30° C. After draining off the spent acid, 40 grams of beta-pinene were added, and the slurry was washed with water to an apparent acidity of about 0.05%. To the terpin hydrate-oil slurry were added 500 ml. of 0.52% sulfuric acid and the mixture refluxed for about 1.5 hours. The resulting crude pine oil (94%) was neutralized with 2% sodium carbonate and was then fractionated, adding 0.1% sodium hydroxide to the still pot. The yield of distilled pine oil (B.P. 114°–136.5° C./50 mm.) was 63.4%, based on the pinene used.

EXAMPLE 4

*Preparation of pine oil from sulfate turpentine*

396 grams of Starpyn (sulfate turpentine) and 1864 grams of 29.4% sulfuric acid were agitated in the presence of 0.39 gram Igepal CO-630 for approximately 12 hours at a temperature of about 25°–30° C. After draining off the spent acid, 40 grams of beta-pinene were added and the slurry was washed with water to an apparent acidity of 0.2%. To the terpin hydrate-oil slurry was added 460 ml. of 0.48% sulfuric acid, and the mixture was refluxed for about 2 hours. The resulting crude pine oil (90%) was neutralized with 2% sodium carbonate and was then fractionated, adding 0.1% sodium hydroxide to the still pot. The yield of distilled pine oil (B.P. 114°–137° C./50 mm.) was 65.7%, based on the amount of pinene used.

EXAMPLE 5

The procedure set forth in Example 4 was followed substantially as set forth therein except that 60 grams of hexane were added to the crude mixture of terpin hydrate in order to break up the agglomerates and provide for a more facile washing. The yield of distilled pine oil was 64.9%, based on the amount of pinene used.

EXAMPLE 6

The procedure set forth in Example 4 was followed substantially as set forth therein except that 50 grams of para-cymene were added to the crude mixture of terpin hydrate in order to break up the agglomerates and provide for a more facile washing. The yield of distilled pine oil was 65.4%, based on the amount of pinene used.

EXAMPLE 7

One mole (136 grams) of alpha-pinene was vigorously agitated with 2 moles of 30% sulfuric acid at a temperature of about 25°–30° C. for at least 8 hours in the presence of a surface active agent stable in strong sulfuric acid. The resulting mixture of terpin hydrate and terpene hydrocarbons was allowed to separate from the heavier sulfuric acid layer, which was drawn off and re-used. The terpin hydrate mixture was then diluted with about 10% fresh alpha-pinene (13.6 grams) and was thoroughly washed with aqueous media to remove the sulfuric acid. The product was then refluxed with 0.5% sulfuric acid (or with oxalic acid) until the terpin hydrate was decomposed to alpha-terpineol (about 1½ hours). The crude synthetic pine oil was fractionated in the presence of sodium hydroxide in vacuo and the fraction of boiling point 114°–136° C./50 mm. was collected. A fraction consisting of unconverted alpha-pinene was recycled. Yield: 65% based on pinene charged; 72% based on pinene used.

Although we have described but a few specific examples of our inventive concept, we consider the invention not to be limited thereto and that suitable changes, variations and modifications may be made without departing from the spirit and scope of the invention.

This is a continuation-in-part of our copending application Serial No. 407,811, filed February 2, 1954, and now abandoned.

What we claim is:

1. In a method of producing alpha-terpineol from a pinene-containing material which includes reacting the pinene-containing material with sulfuric acid to form a crude agglomerated reaction mixture containing terpin hydrate, occluded sulfuric acid, unreacted pinene-containing materials and oily by-products, removing a substantial portion of the sulfuric acid, and then dehydrating the terpin hydrate to form alpha-terpineol, the improvement which comprises treating the crude agglomerated reaction mixture with a small amount of a hydrocarbon solvent, sufficient to reduce the viscosity of the crude reaction mixture and to break up the agglomerates therein, and then washing with aqueous media to effectively reduce the occluded sulfuric acid content to a predetermined maximum concentration for the subsequent dehydration of the terpin hydrate to alpha-terpineol, whereby the necessity of isolating and purifying the terpin hydrate is obviated.

2. In a method of producing alpha-terpineol from a pinene-containing material which includes reacting the pinene-containing material with sulfuric acid to form a crude agglomerated reaction mixture containing terpin hydrate, occluded sulfuric acid, unreacted pinene-containing materials and oily by-products, removing a substantial portion of the sulfuric acid and then dehydrating the terpin hydrate to form alpha-terpineol, the improvement which comprises treating the crude agglomerated reaction mixture with from about 5% to about 15% by weight of a hydrocarbon solvent based on the weight of the pinene-containing material originally reacted to reduce the viscosity of the crude reaction mixture and to break up the agglomerates therein and then washing with aqueous media to effectively reduce the occluded sulfuric acid content to a predetermined concentration for the subsequent dehydration of the terpin hydrate to alpha-terpineol, whereby the necessity of isolating and purifying the terpin hydrate is obviated.

3. The improved method defined in claim 2 wherein the hydrocarbon solvent is alpha-pinene.

4. The improved method defined in claim 2 wherein the hydrocarbon solvent is beta-pinene.

5. The improved method defined in claim 2 wherein the hydrocarbon solvent is hexane.

6. The improved method defined in claim 2 wherein the hydrocarbon solvent is para-cymene.

References Cited in the file of this patent

UNITED STATES PATENTS

| | | |
|---|---|---|
| 2,088,030 | Meuly | July 27, 1937 |
| 2,178,349 | Sheffield | Oct. 31, 1939 |
| 2,295,705 | Wissenborn | Sept. 15, 1942 |